United States Patent [19]

Mercer et al.

[11] Patent Number: 6,167,429
[45] Date of Patent: Dec. 26, 2000

[54] SERVICE ACCESS USING LIMITED SET OF CHARACTERS

[75] Inventors: David Edward William Mercer; Ian Alexander Macfarlane, both of Stittsville; A. Julian Craddock, Greely, all of Canada

[73] Assignee: Nortel Networks Limited, Montreal, Canada

[21] Appl. No.: 09/064,516

[22] Filed: Apr. 23, 1998

[30] Foreign Application Priority Data

Oct. 3, 1997 [CA] Canada ................................ 2217473

[51] Int. Cl.[7] ...................................................... G06F 13/00
[52] U.S. Cl. .......................................................... 709/203
[58] Field of Search ...................................... 709/200, 202, 709/203

[56] References Cited

U.S. PATENT DOCUMENTS

5,524,139  6/1996  Jones ........................................ 379/67
5,524,146  6/1996  Morrisey et al. ........................ 379/207

*Primary Examiner*—Robert B. Harrell
*Attorney, Agent, or Firm*—Angela C. de Wilton

[57] ABSTRACT

Using a server to provide access to a plurality of unrelated types of services, to a user communicating from a remote terminal to the server, by detecting a service access command sent from the user, the service access command comprising an indication of a service type, the service access command having a syntax which uses only alphanumeric characters, or "#" or "*" characters. Interpreting the command involves extracting the service type, to detect if the command further comprises one or more parameters relating to the service, extracting any such parameters and initiating the provision of the selected service. By having a server which understands commands in a form having a syntax using a limited set of characters, service access from telephones or terminals with smaller keyboards, becomes easier.

17 Claims, 10 Drawing Sheets

SERVICE ACCESS USING LIMITED SET OF CHARACTERS

FIELD OF THE INVENTION

The invention relates to methods of using a server to provide access to a plurality of unrelated types of services to a user communicating from a remote terminal, to methods of using a remote terminal to access a range of unrelated types of services available by communicating with a server, to servers for providing access to a plurality of unrelated types of services to a user communicating from a remote terminal, and to software for such methods and apparatus.

BACKGROUND OF THE INVENTION

It is known from U.S. Pat. No. 5,524,146 to access information services delivered in formats such as voice, data, facsimile or video, by dialling short dedicated access codes. This removes the need for a user to recall a large number of telephone numbers. A user may be prompted with menu options, selectable by entering more digits, to identify a particular service provider or a particular service. This enables access from POTS (Plain Old Telephone System) handsets, capable of sending DTMF tones, with no additional interface capability. However, no provision is made for accessing services which require more complete interaction with the user, e.g. input of a message to be faxed or e-mailed to a third party, or address of a host on the internet.

One way of making it easier to access such information services is known from U.S. Pat. No. 5,524,139. The manual access by entry of appropriate DTMF tones, and waiting for prompts, is recorded. This enables automated access by automatic generation of the tones with appropriate delays, upon request by the user.

For access to services requiring more complex interaction, it is known to provide a server which recognizes Tagged Text Mark Up Language (TTML) commands sent by a user.

TTML is known from Smart Messaging Specification Revision 0.9.9, Jun. 6, 1997 Draft, Nokia MobilePhones Ltd. to enable access to a range of services such as e-mail or fax delivery of messages, or internet browsing, by providing a server which interprets commands sent from a telephone handset. It provides means to:

enter text into fields;

make selections from different kinds of menus; and jump to links (using anchors).

However, the telephone needs a tailored interface to facilitate generation of appropriate strings of characters. Although the strings can be generated manually, without such an interface, from many standard handsets, the strings of characters are difficult to remember and many of the characters are not visible on the keypad and require multiple button presses. On many phones the special characters used in TTML (such as <>:.) may need an extended keypad or may not be available at all. For a Nortel PCS 1911 phone:

space=2 key presses

-=3 key presses

>=7 key presses

<=6 key presses

.=4 key presses

:=6 key presses

CR=1 key presses

@=4 key presses

This makes the services difficult to access for users and limits the use of the service by non-TTML enabled phones.

It means that it is more difficult to add new services, since users have difficulty recalling how to use a limited number of services. Also, the commands take up a considerable proportion of the limited length (160 characters) of a single SMS message (a GSM bearer service), thus limiting the length of transactions users may deliver to servers.

It is also known to access a particular device from a telephone, using a relatively simple set of commands, e.g. to control an answering machine remotely. A conventional 12 key telephone keypad is used, typically using the "#" key to delimit by indicating the end of numeric entries.

Appropriate entries are prompted by an Interactive Voice Response (IVR) unit. However such strings of characters used as commands have a single purpose, and do not form a language, to be interpreted and used in various combinations to create many different commands. Also there is no provision for accessing different types of service, only different commands or parameters for a single type of service, or controlling a single system.

SUMMARY OF THE INVENTION

It is an object of the invention to provide improved methods and apparatus.

According to the invention, there is provided a method of using a server to provide access to a plurality of unrelated types of services, to a user communicating from a remote terminal to the server, comprising the steps of: at the server, detecting a service access command sent from the user, the service access command comprising an indication of a service type, the service access command having a syntax which uses only characters selected from alphanumeric characters, and the "#" character, and the "*" character; interpreting the service access command to identify the service type, to detect if the service access command further comprises one or more parameters relating to the service, and identify any such parameters; and initiating the provision of a service to the user according to the service type indication detected in the service access command.

By having a server which understands commands in a form having a syntax using a limited set of characters, service access from telephones or terminals with smaller keyboards, becomes easier. It is easier to remember the syntax, and manual input of the characters can be quicker than before. This could enable more complex commands to be useable, and new services can be added more easily. By providing a simple syntax and limiting the use of special characters it becomes feasible to use existing telephones which are not provided with a browser-type interface, to access a range of services requiring commands with parameters.

Preferably, the services comprise communication services for sending information from the user, or obtaining information and sending it to the user. There is more and more demand for such services, and the above advantage of greater ease of use from legacy phones applies more strongly.

Advantageously, the method further comprises the steps of determining that the service for which access has been requested, is a service type which requires a parameter representing a source or destination for information to be received by the user, or sent by the user respectively; detecting and extracting the parameter; and providing the requested service using the parameter. For such commands, the ease of use advantages are particularly notable.

Preferably, the method further comprises the step of deriving in a programmable manner, from the received service type indication, a service start address defining where to find a process for providing the service type indicated. By making the derivation programmable, e.g. using a software conversion algorithm, or a hash table for mapping service tags to service references, the configuration of the system can be upgraded more easily, e.g. to accommodate new services.

Advantageously, the service access command is received via a short message system carried over a signalling channel. This enables communication with no requirement for call set up, which gives reduced charges to a user, and makes much more efficient use of bandwidth.

Preferably, the syntax of the service access command comprises a single character delimiter preceding the service type indication. This keeps the length of commands short and makes the delimiter easier to remember.

Advantageously, the syntax of the service access command comprises a single character delimiter preceding any parameters. This keeps the length of commands short, and makes the delimiter easier to remember.

According to another aspect of the invention, there is provided a method of using a remote terminal to access a range of unrelated types of services made available by a server as set out above, the method of using the remote terminal comprising the step of: generating and sending to the server a service access command comprising an indication of a service type, and using a syntax which uses only characters selected from alphanumeric characters, and the "#" character, and the "*" character.

According to another aspect of the invention, there is provided a method of using a remote terminal to access a range of unrelated types of services available by communicating with a server, the server being arranged to detect a service access command sent from the user; to interpret the service access command to identify the service type; to detect if the service access command further comprises one or more parameters relating to the service, and identify any such parameters; and being arranged to initiate the provision of a service to the user according to the service type indication detected in the service access command, the method of using the remote terminal comprising the step of: generating and sending to the server the service access command, which comprises an indication of a service type, and which, when sent, uses a syntax which uses only characters selected from alphanumeric characters, and the "#" character, and the "*" character.

Advantageously, the above method further comprises the step of buffering the service access command in the remote terminal before sending to the server. This means that character sequences to access frequently used services can be stored for future use or reuse. They can be displayed and/or edited more easily. Also, the number of communications to the server can be reduced, which speeds operation of the server.

Preferably, the remote terminal comprises a telephone handset. As the vast majority of existing telephone handsets have a limited keyboard, the advantages of the invention are particularly notable.

Advantageously, the telephone handset communicates over a wireless link. In this case connect time can be reduced, and since less airtime is necessary, more traffic can be handled.

According to another aspect of the invention, there is provided a method of using a server to provide access to a plurality of unrelated types of services, to a user communicating from a remote terminal to the server, comprising the steps of: at the server, detecting a service access command sent from the user, the service access command comprising an indication of a service type, the service access command having a syntax which uses only characters selected from alphanumeric characters, and the "#" character, and the "*" character, the service access command further comprising one or more parameters relating to the service, and received from the user without sending a prompt to the user; interpreting the service access command to identify the service type, and to identify the one or more parameters; and initiating the provision of a service to the user according to the service type indication detected in the service access command. This enables the service access command to be completed more quickly by the user, and processed more quickly by the server. Thus system capacity can be increased, and less communication bandwidth is required.

According to another aspect of the invention, there is provided a server for providing access to a plurality of unrelated types of services, to a user communicating from a remote terminal to the server, the server comprising: detection means arranged to detect a service access command sent from the user, the service access command comprising an indication of a service type, the service access command having a syntax which uses only characters selected from alphanumeric characters, and the "#" character, and the "*" character; interpreting means arranged to interpret the service access command to identify the service type; parameter detection means arranged to detect if the service access command further comprises one or more parameters relating to the service, and identify any such parameters; and service initiating means, operable according to the service type indication detected in the service access command, to initiate the provision of the service to the user.

Preferably, a system for providing services, comprising the above server, and other servers for processing different ones of the types of services, is provided, the above server being arranged to select one of the other servers and request it to provide the service to the user. If the service provision can be distributed, it is easier to enable access to existing services. Also, processing capacity constraints can be eased.

According to another aspect of the invention, there is provided software stored on a machine readable medium for carrying out a method of using a server to provide access to a plurality of unrelated types of services, to a user communicating from a remote terminal to the server, comprising the steps of: at the server, detecting a service access command sent from the user, the service access command comprising an indication of a service type, the service access command having a syntax which uses only characters selected from alphanumeric characters, and the "#" character, and the "*" character; interpreting the service access command to extract the service type, to detect if the service access command further comprises one or more parameters relating to the service, and extract any such parameters; and initiating the provision of a service to the user according to the service type indication detected in the service access command.

Preferred features may be combined as would be apparent to a skilled person, and may be combined with any aspect of the invention.

To show, by way of example, how to put the invention into practice, embodiments will now be described in more detail, with reference to the accompanying drawings.

DETAILED DESCRIPTION

Figure 1:
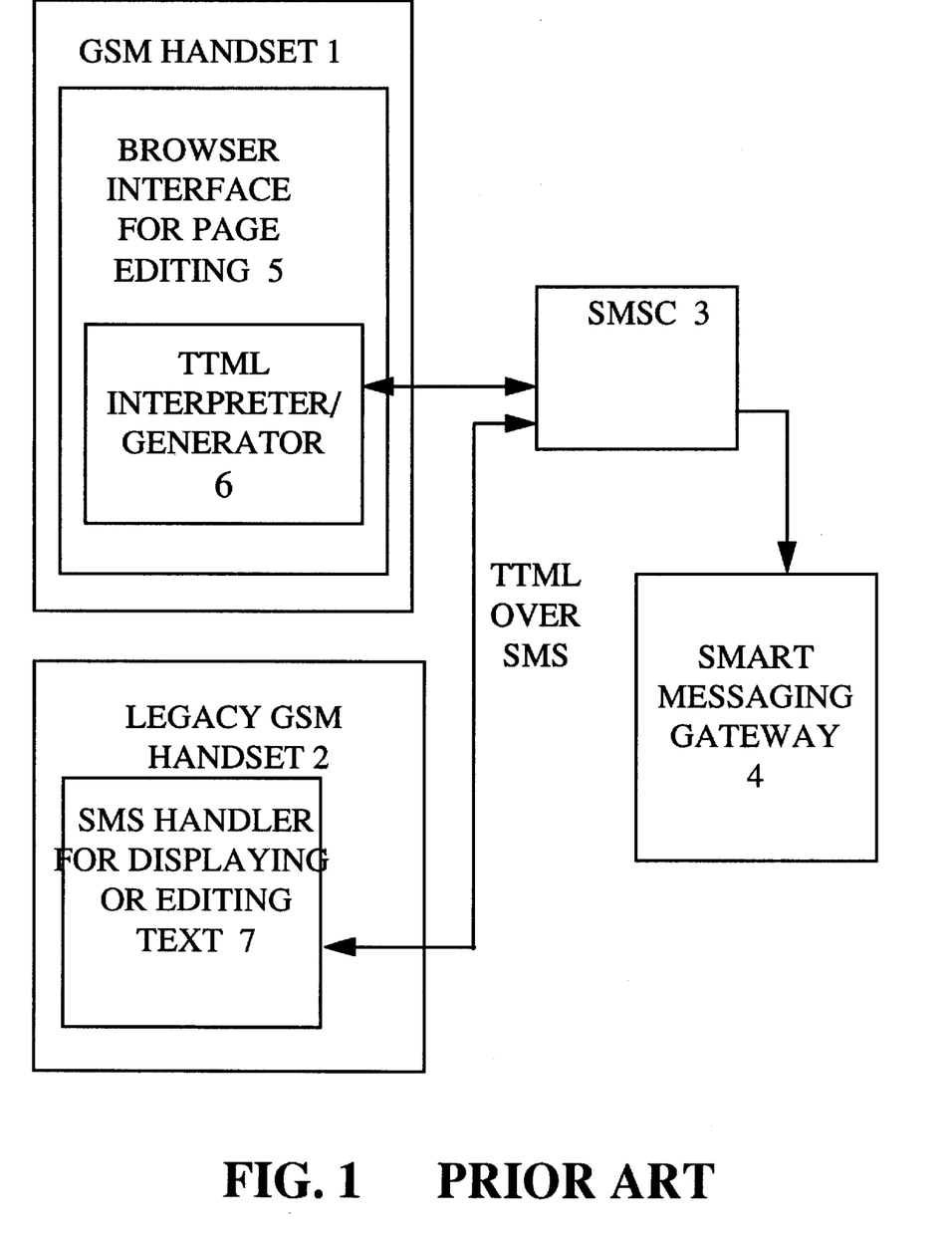
FIG. 1 a prior art arrangement making use of TTML.
Figure 2:
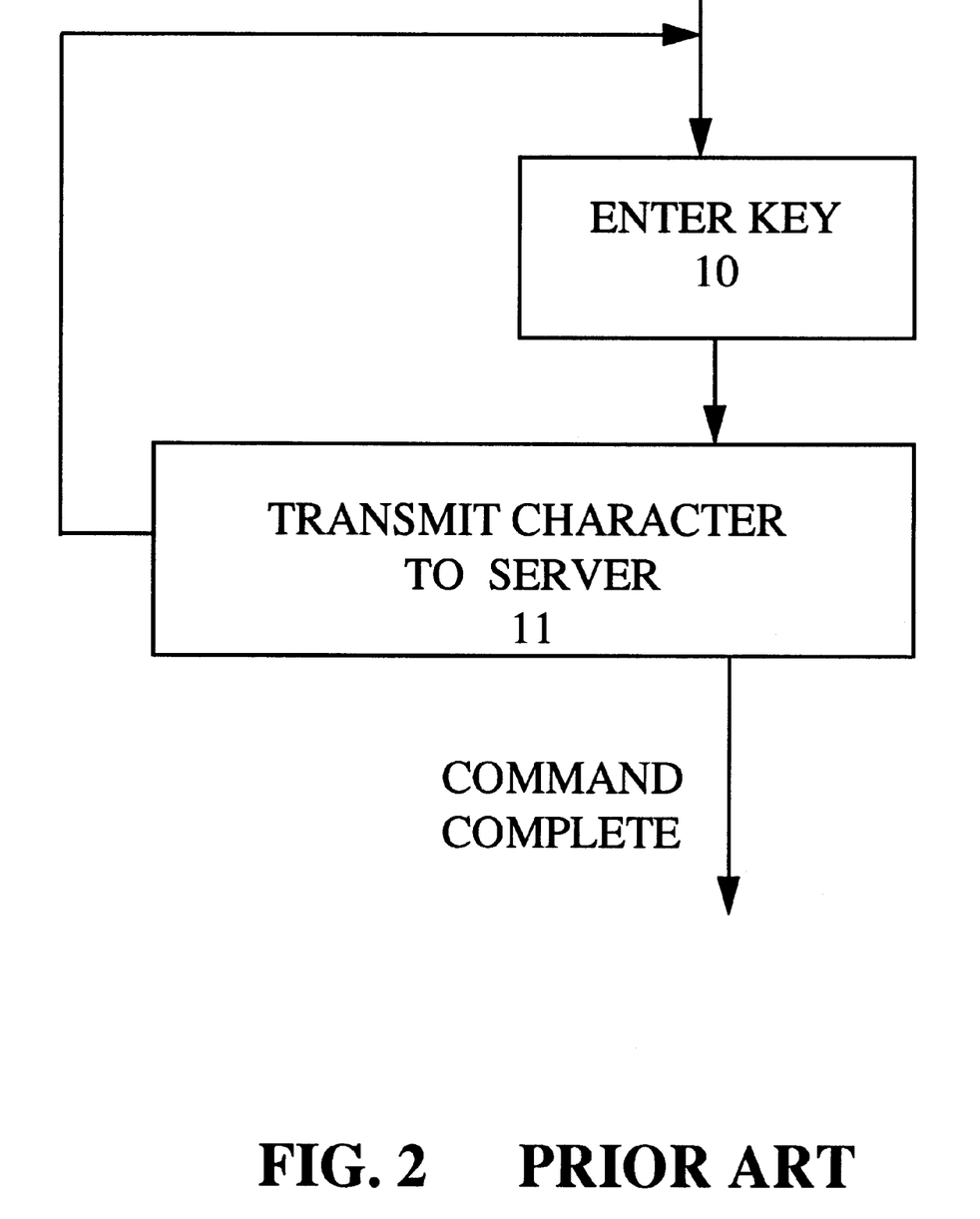
FIG. 2 shows a prior art method of handling character input.
Figure 3:
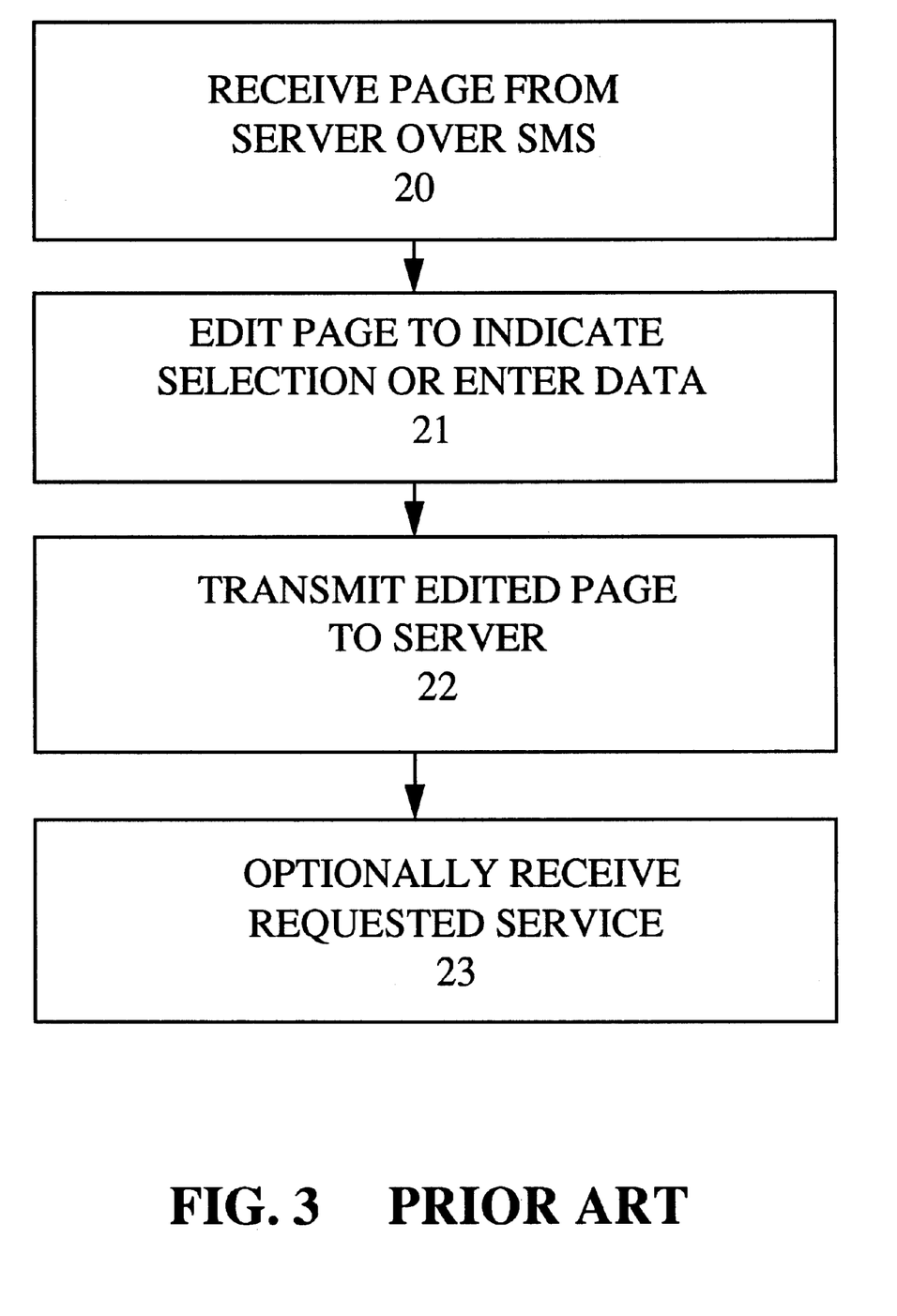
FIG. 3 shows a conventional TTML service access process.

FIGS. 1–3: Prior Art

A known service access system using TTML is shown in FIG. 1. A GSM handset 1 or a Legacy GSM handset 2 communicate with a short message service center (SMSC) 3. This passes the messages to a Smart Messaging gateway 4, where the TTML is interpreted, and provision of the relevant service is initiated.

The GSM handset 1 includes a browser interface 5, for page display and editing. The browser interface includes a TTML interpreter and generator, to enable access to services from a telephone handset by using TTML to enter text into fields, make selections from menus, or jump to links. The TTML commands are sent over SMS. If the handset does not have a browser interface, the system can still be used, provided there is some way to input TTML commands manually, and pass them to the smart messaging gateway 4.

As shown in FIG. 1, a Legacy GSM handset 2 comprises an SMS (short message system) handler 7, for displaying or editing text and sending messages which can contain TTML commands.

FIG. 2 illustrates in schematic form how characters might otherwise be entered and sent to a server, if the browser interface 5 of FIG. 1 is not used. For example, DTMF tones could be used to send characters from a telephone handset to an interactive voice response system, (IVR). At 10, a user enters a character by pressing the selected key on the keypad. At 11, the character is sent straightaway to the server. As soon as the server determines that all the characters have been input, according to how many it is expecting to be input, the server then takes appropriate action.

FIG. 3 shows some of the principal activities taking place at the handset, in a conventional TTML service access process. At 20, the handset perceives a page from the server, in the form of one or more SMS messages. The handset will display the page, and typically including a menu. The TTML formatted page enables a user to edit the page or indicate his selection, by using an SMS message edit facility on the handset, at 21. At 22, the edited page can be transmitted back to the server as one or more SMS messages. The server can then initiate the requested service by parsing the received page. If appropriate, a response may be sent back to the handset which is received at 23.

Figure 4:
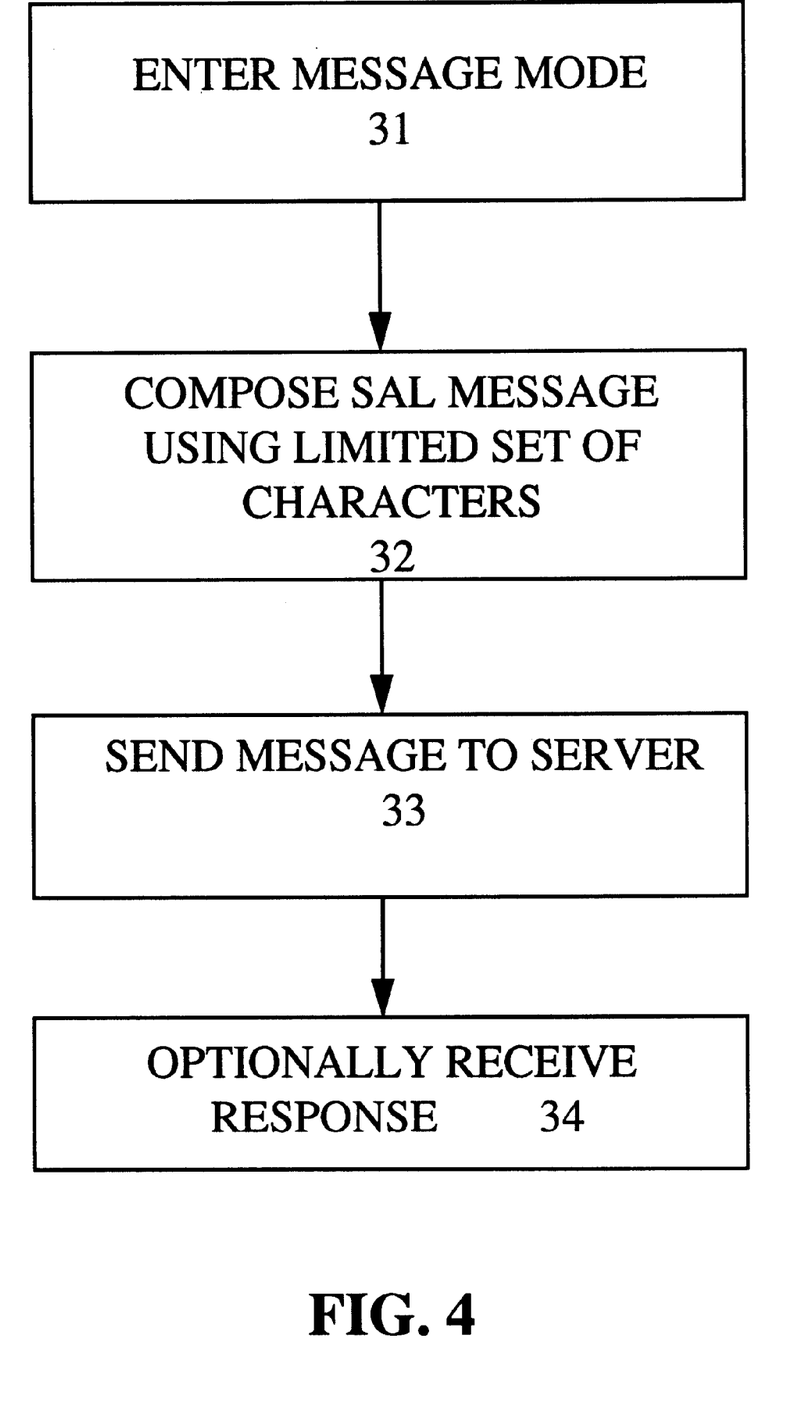
FIG. 4 shows some user steps according to an embodiment of the invention.

FIG. 4 Embodiment of the Invention: Steps Taken by User

FIG. 4 shows some of the steps taken according to an embodiment of the invention. At 31, the user enters the message compose mode on his terminal. If the terminal is a GSM handset with SMS message capability, the user at this point would enter the SMS message compose facility of his handset. This usually involves a short series of keystrokes as prescribed by the handset manufacturer.

At 32, the user composes the service access command using a syntax making use of alphanumeric characters or the "star" character or the "octothorpe" character (better known as the hash character). An example of such a syntax is the SAL (service access language) syntax, of which details are given below. Many twelve button keyboards, as are used commonly on telephone handsets, all the alphanumeric characters, and the characters "star" and "hash" have legends printed on the keys. Thus, all these characters can be readily entered, without having to remember sequences of keystrokes. It remains for the user only to remember the syntax of the service access command and any parameters needed for the command.

When the service access command has been entered, including any parameters which are necessary, the command can be sent to the server. It would be possible to send the command character by character, or in smaller groups of characters, but it is preferable to send the command in a single SMS message. This eases processing requirements at the server, enabling greater capacity, or faster response by the server. It also eases bandwidth requirements for any wireless link in the communication path, and reduces the likelihood of congestion in the path followed by the SMS messages, and at the SMSC 3.

When the server receives the command, it parses the command, initiates the requested service, and optionally transmits a response to the user. In the embodiment using SMS messages, the response could be received by the handset using an SMS message, and displayed by the handset for the user to see. Depending on the type of response, which depends on the type of service, the response could be sent to the user in the form of automatically generated speech, transmitted using the public service telephone network (PSTN).

Figure 5:
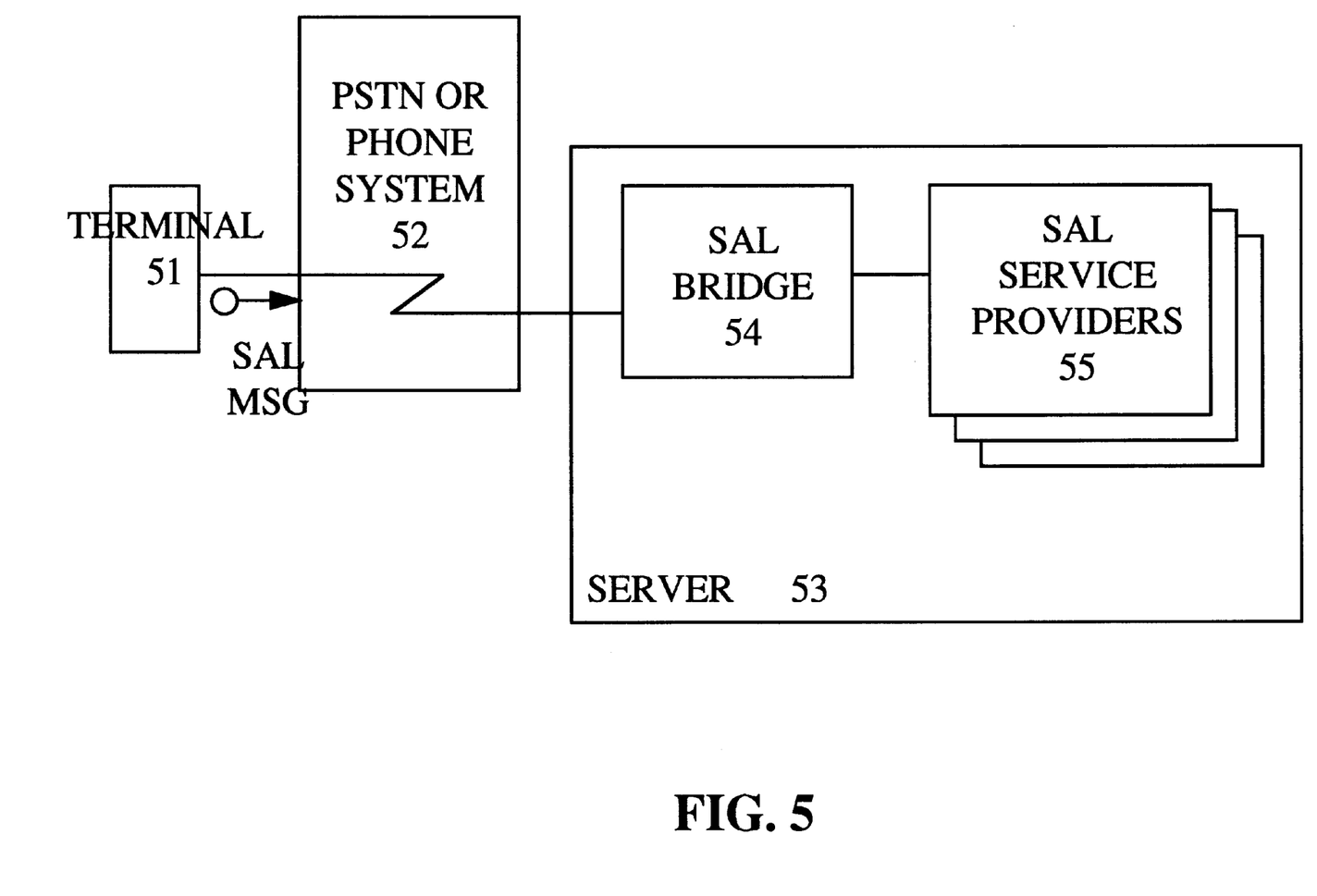
FIG. 5 shows in schematic form a generic architecture according to an embodiment of the invention.

FIG. 5 Generic Architecture Schematic

FIG. 5 illustrates in schematic form a generic architecture for providing a range of different types of services to users via the PSTN. A user's terminal 51, such as a telephone handset, is connected to the PSTN 52, which links the terminal to the server 53. The server comprises a service access bridge 54, and service providing processes 55, (hereinafter SAL services).

The basic function of the bridge is to route a service access command from the terminal, to the appropriate SAL service, based on a service type indicator, or tag. The SAL service then acts on the parameters provided in the command, to initiate the requested service. The bridge may be a process or thread running within the server, which encapsulates all the functionality for processing service access commands, or messages containing these service access commands.

The server 53 may embodied by a computer connected to the phone system. If SMS messages are used for conveying the service access commands, then the computer could be connected to the SMSC of a Cellular operator. In this case, the messages may not need to be routed over the PSTN, but retained within the cellular operator network of a particular operator, or even a private telephone network.

FIG. 5 also shows a service access command in the form of a SAL message 56, being sent from the terminal towards the server. The bridge 54 when parsing the SAL message will detect and extract the service type indication, according to the syntax of the command. Then, the entire SAL message, including the service tag and any parameters can be sent to the relevant SAL service 55.

The same SAL services could be accessed by a different route, e.g. using the known TTML method, so that both methods may be used side by side (not illustrated).

Figure 6:
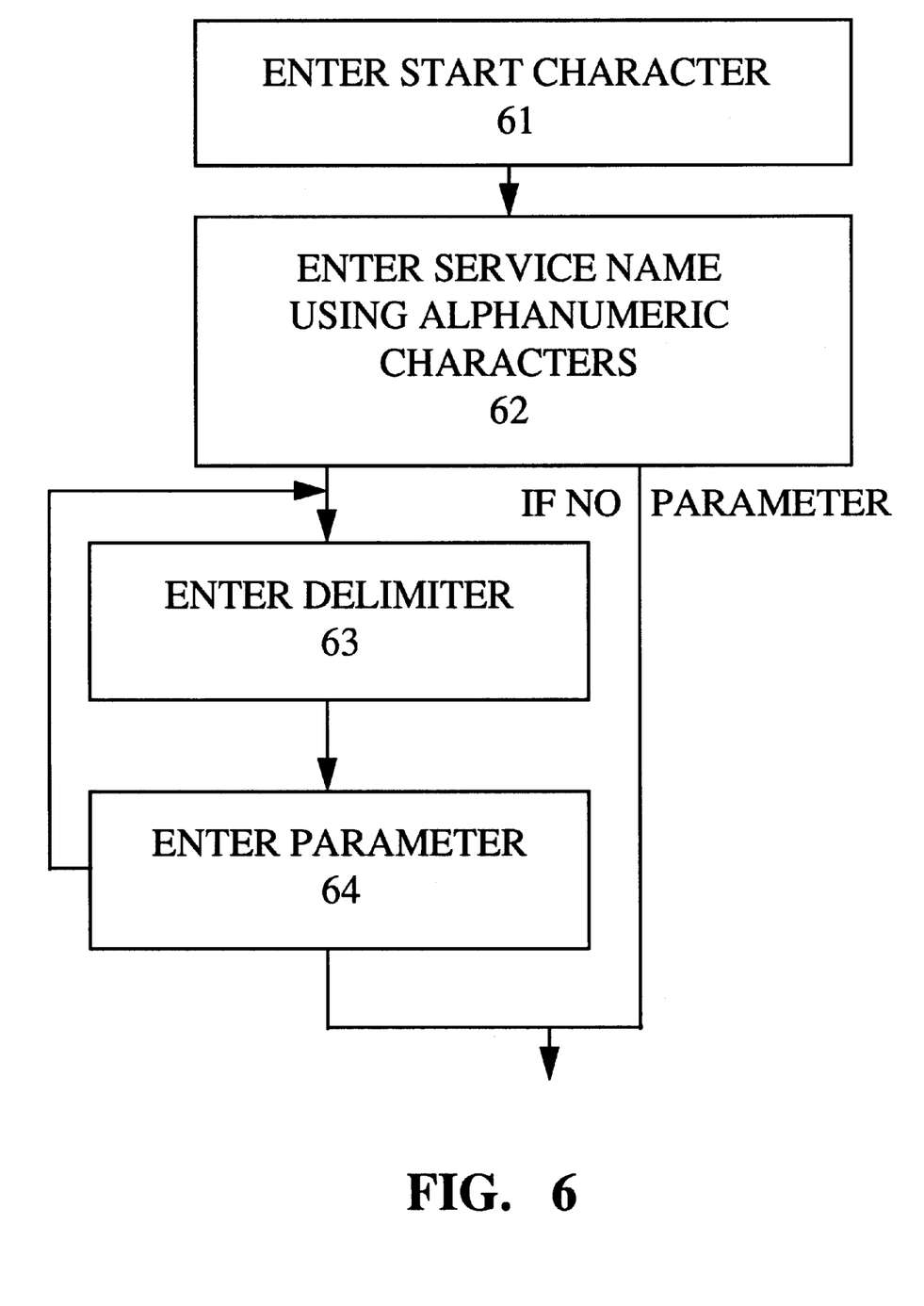
FIG. 6 shows steps in composing a service access command.

FIG. 6 Steps in Composing a Service Access Command

FIG. 6 shows some of the principal steps in composing a service access command, in the form of a SAL message.

At 61, a start character is entered. This indicates that the SMS message contains a SAL message, for the embodiment in which SMS messages are used.

At 62, the indication of the service type, in the form of a service tag, is entered using characters readily available on the keypad of the handset. If no parameters are needed for that service type, then steps 63 and 64 are bypassed. Step 63 shows the entry of a delimiter character if any parameters are needed. At 64 the parameter is entered using characters readily available on the keypad of the terminal.

Steps 63 and 64 are repeated until all parameters have been entered.

Figure 7:
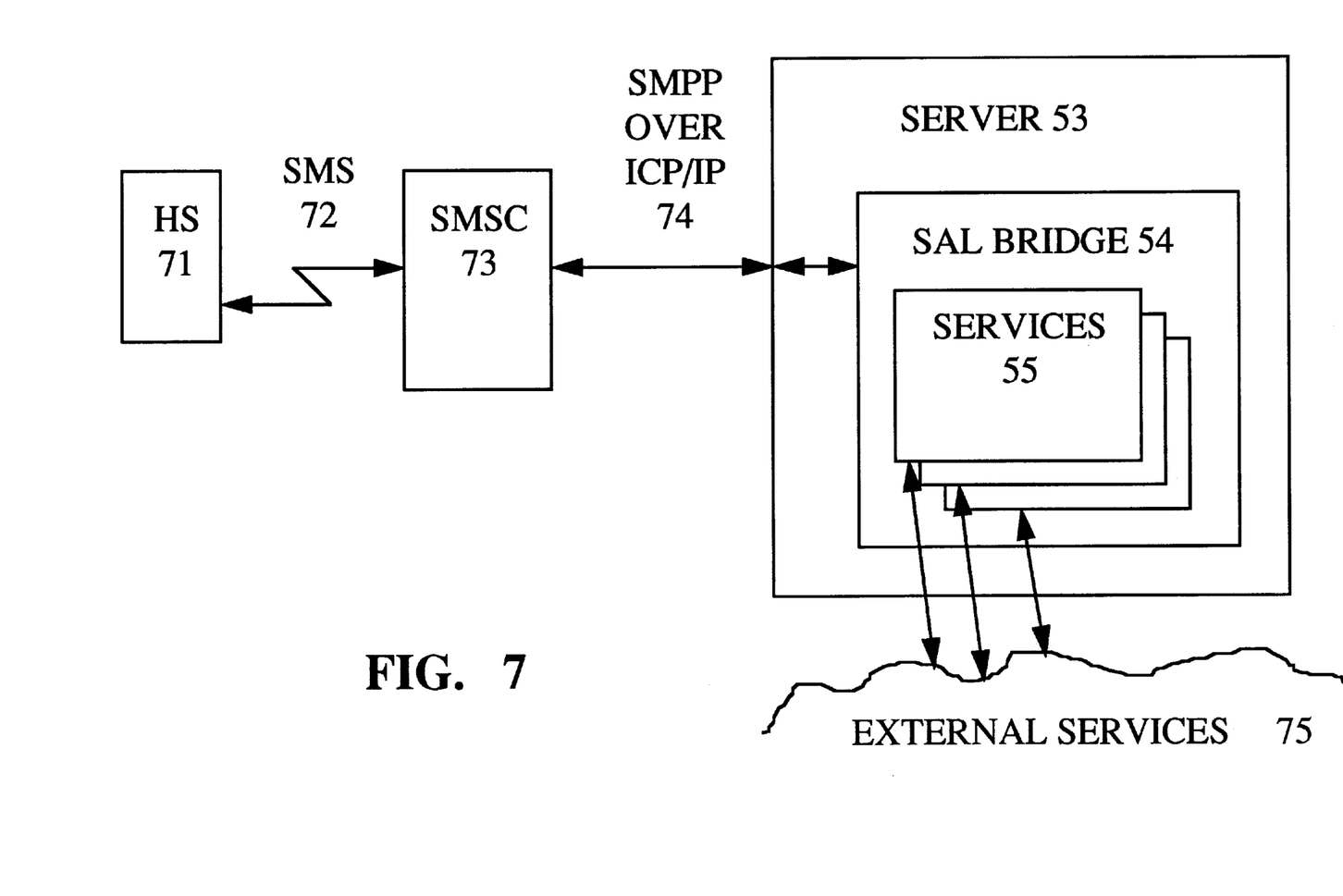
FIG. 7 shows an architecture schematic for a GSM embodiment.

FIG. 7 Architecture Schematic for GSM Embodiment

FIG. 7 shows in schematic form a high level view of the architecture of FIG. 5 arranged for use with GSM handsets using SMS to transfer service access commands and other messages. A handset 71 is connected to a GSM network, which is used to pass SMS messages 72 to an SMSC (short message service center) 73. The server 53 is connected to the SMSC by a link, for example, a TCP/IP (transmission control protocol/Internet protocol), using SMPP (short message peer-to-peer protocol). The server 53 includes a bridge 54 and SAL services 55. As illustrated, the SAL service processes 55 may access external services, 75, for example Internet world wide web based services. The SAL services 55 can be programmed to access such external services.

In FIG. 7, the SAL services 55 are shown within the bridge 54, though it is a matter of implementation as to whether they are encapsulated within the bridge, or, as in FIG. 5, treated as separate processes. The link 74 between the SMSC and the server can be provided using other protocols, such as X.25, if desired.

Figure 8:
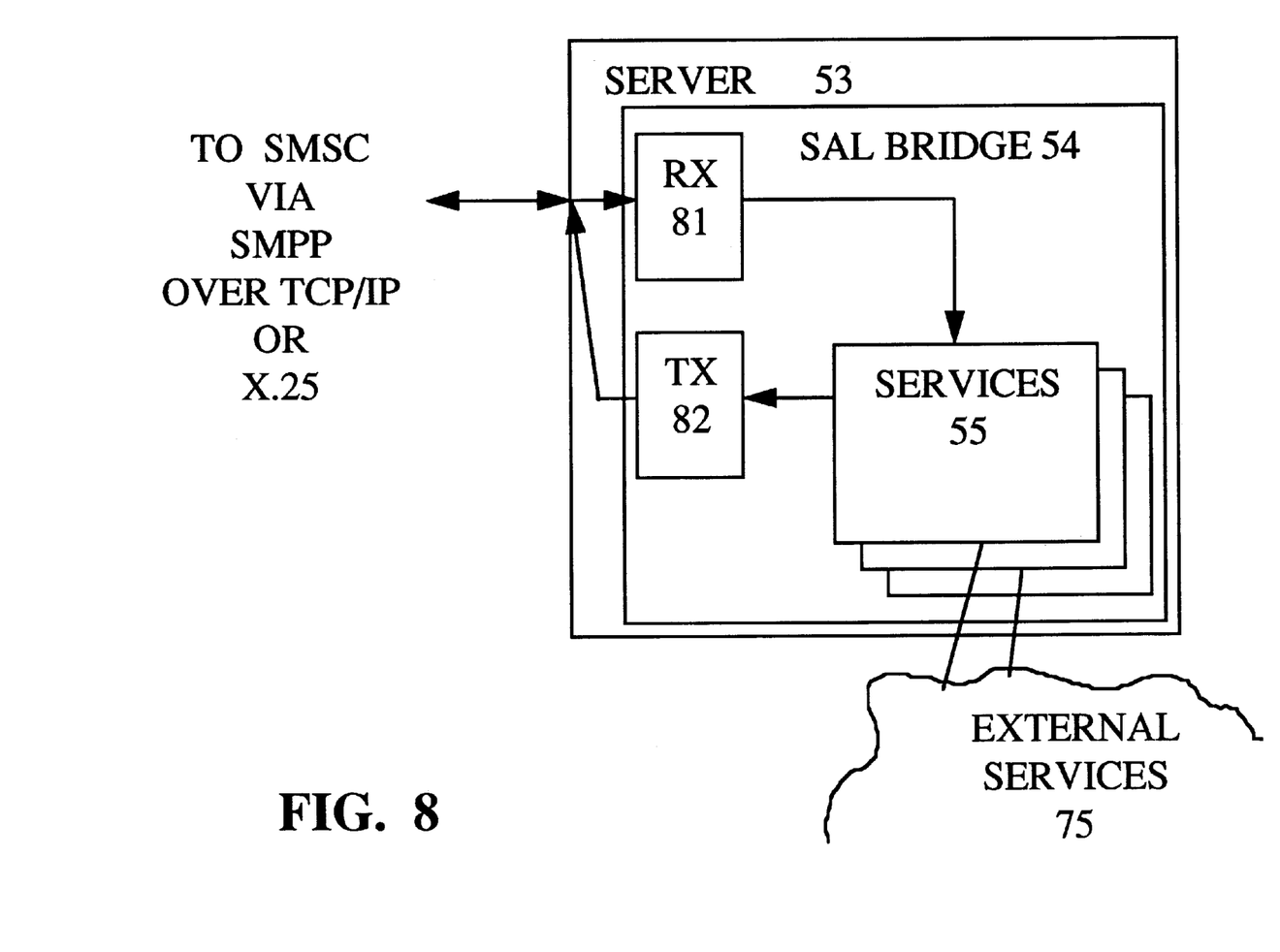
FIG. 8 shows a server in schematic form.

FIG. 8 Server 53

FIG. 8 shows the server 53 of the GSM implementation (also suitable for the other embodiments), in schematic form, in more detail. The bridge 53 comprises a receiver 81, in the form of a thread within the bridge, which receives SMS messages from the SMSC and processes them by detecting and extracting the service tag, indicating the type of service. The receiver will also detect errors in messages received from the SMSC, and take appropriate action. A transmitter 82, another thread or process within the bridge, is provided for transmitting messages back to the user via the SMSC. The server 53 can be treated by the SMSC as an external short message entity, for the purposes receiving SMS messages.

Figure 9:
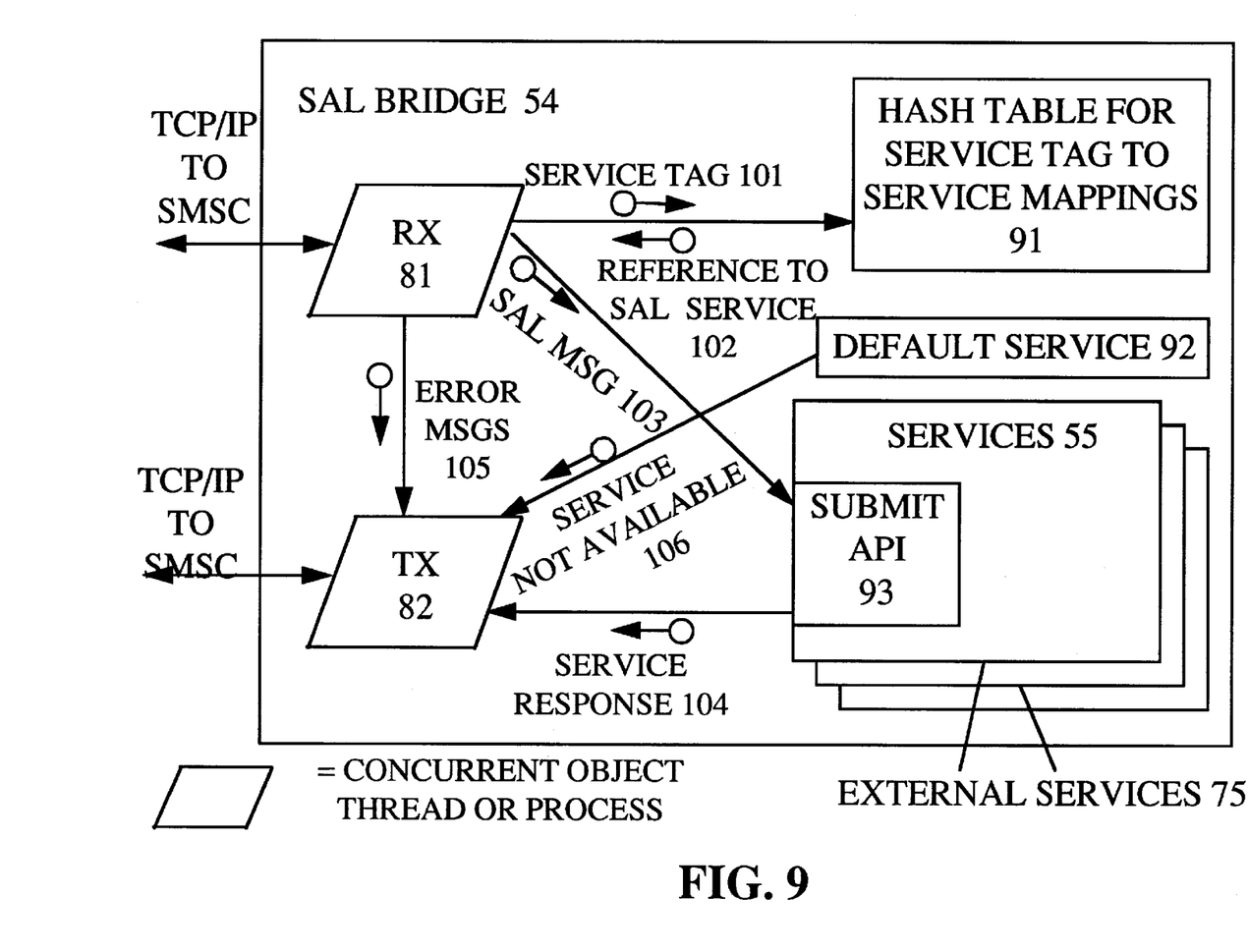
FIG. 9 shows a bridge in schematic form.

FIG. 9 Bridge 54

FIG. 9 shows the bridge 54 in schematic form in more detail. The receiver 81 and the transmitter 82 are shown as concurrent processes or threads, or objects. A hash table 91 is provided for mapping service tags to SAL services 55.

These services could be implemented as objects, processes or threads, which are instantiated when required, and control access to other resources, such as the external services 75, as appropriate. Each SAL service 55 includes a Submit API (application programming interface) 93, to enable service access commands, in the form of SAL messages, to be submitted from the receiver, to the appropriate SAL service. If all such SAL services implement the Submit API, the receiver can then submit messages in a uniform manner, regardless or the class or data type of the service provider object.

A default SAL service provider object 92 can be instantiated for the case where no service is available for the requested service tag. In this case, a reference to the "default" SAL service is returned by the hash table. The default service returns a service not available message to the transmitter in response to all SAL messages submitted to it.

A path between the receiver 81 and the transmitter 82 is provided for error messages, in the event that the receiver detects an error such as a misformed message from the SMSC. In this case, the transmitter is used to send an appropriate error message back to the SMSC. The receiver can check whether each message from the SMSC contains a valid SAL message. In an alternative implementation, the receiver could determine whether there is a valid parameter relating to the service type, if the service type requires this. An advantage of having the SAL service extract the parameters is that the format of the parameters need be known only by the SAL service, so adding services would involve updating the hash table, and instantiating the new SAL service. No change would need to be made to the receiver. An error message can be sent back to the SMSC if any inconsistency is detected, such as no leading delimiter, or no service tag.

A summary of the operation of the server now follows:
1. The SAL Bridge creates the Receiver, Transmitter and Hash Table.
2. The Receiver and Transmitter each open a TCP/IP socket and bind to the SMSC by submitting SMPP bind messages.
3. When the Receiver receives a Deliver-SM message from the SMSC, it parses the message to detect and extract the service tag 101.
4. The Receiver requests, from a Hash Table, a reference 102 to the SAL Service corresponding to the Service Tag. If no SAL service corresponds to the Service tag, a reference to the Default Service 92 is returned. If the Service is the Default SAL Service, it returns an error message to the user informing it that the requested service does not exist.
5. The Receiver then submits the message 103 to the SAL Service denoted by the reference 102. If a SAL message is submitted to the Default service, it sends a message 106 to the transmitter indicating that the requested service is not available. This is passed to the user via the SMSC.
6. The SAL Service parses the parameters of the submitted message and processes them. If appropriate, the Service may or may not go to an external server, or data source. The parameters could conceivably be parsed, i.e. identified and extracted by the receiver, and sent on to the SAL service separately.
7. If appropriate, the SAL Service submits a response 104 to the Transmitter.
8. The Transmitter creates a submit-SM message and transmits it to the SMSC for delivery to the user. Error messages which the transmitter may pass on include e.g. an unknown service message or server busy.

The functions of the server, as illustrated, can be written in any appropriate language or paradigm. An object oriented language such as Java is preferred for ease of development. It can be run on any suitable processor and operating system. It could be run on Windows NTv4 on a Pentium Pro processor or a Spark Station 5, running Solaris 2.5. The principal functions of the server could be implemented in hardware or firmware, and could be integrated with the SMSC, or with some other part of the telephone network or PSTN linking the user. It is not essential that the server be a stand alone server.

Figure 10:
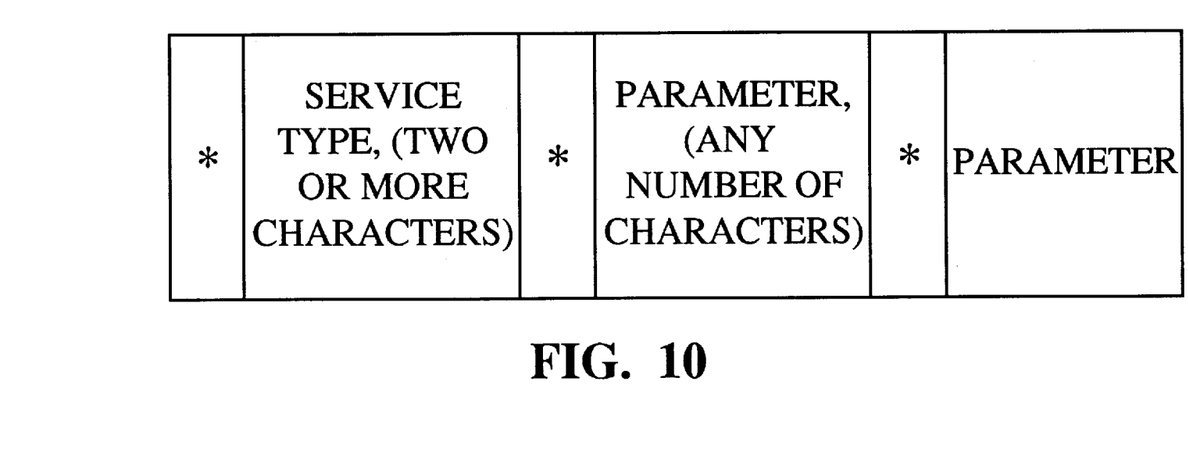
FIG. 10 shows in schematic form an example of a service access command format.

FIG. 10 Service Access Command Format

FIG. 10 shows in schematic form an example of a service access command. A delimiter in the form of a star character precedes a service type indication, comprising two or more characters, chosen from a limited set of characters, for ease of use, the characters should be alphanumeric characters, or the star character or the hash character, provided these characters are not used in positions in the service type indication that could cause confusion with delimiter characters.

Another delimiter character in the form of a star, indicates where a parameter starts. A second parameter follows the first parameter, separated by a delimiter character in the form of a star.

The number of parameters will depend on the service type, and there may be no parameters in some cases. Other characters could be used for the delimiters, and it may unnecessary to have delimiters in some or all of the positions shown, if the receiver or the SAL services objects 55, have some way of distinguishing the service type from the parameters, and the parameters from each other. For example, the service type could be of fixed length, as could the parameters.

BNF Description of SAL Syntax (An Example of a Syntax Using Only Alphanumeric Characters and * and # Characters)

<SAL-request>::=<delimiter><service-name>{<delimiter><Parameter>}*
<service-name>::=<SAL-character>+
<SAL-character>::='any character except "*"
<delimiter>::="*"
<parameter>::=<SAL-character>{<SAL-character>|"**"}*
Note: the "**" is required to allow an asterisk to be included
in the parameter without acting as a field-delimiter.

Syntax Notes

<text> denotes a non-terminal symbol
::= denotes composition or definition
{} denote a grouping of items
* denotes 0 or more occurrences of a non-terminal symbol or group
+ denotes 1 or more occurrences of a non-terminal symbol or group
| denotes a logical OR
text enclosed in "" is a terminal symbol
prose descriptions for non-terminal characters are enclosed in single quotes (')
# denotes a comment (until the end of the line)

EXAMPLES OF MESSAGES IN SAL AND TTML

Example 1

Send an E-mail to an E-mail Address
SAL
Send: *EM*CHRIS#COMPANY.COM*THE CODE FOR CALL FORWARD IS **72 -DAVE
(Keys: 1 3 2 1 4 3 4 4 4 4 4 2 2 2 3 4 4 4 4 2 1 2 3 3 2 4 4 2 3 2 4 4 4 2 4 2 4 4 2 4 4 4 2 2 4 2 2 4 5 2 1 1 1 1 2 3 2 2 4 3=172 keypresses in SAL)
TTML Equivalent
Send: ..EM
>TO: CHRIS#COMPANY.COM
>MESSAGE: THE CODE FOR CALL FORWARD IS *72 -DAVE
(Keys: 44421 7 2 6 6 2 6 3 6 6 8 4 6 6 2 2 2 4 6 4 6 6 2 1 7 2 4 8 8 2 2 4 6 2 2 4 4 2 6 6 2 4 2 6 6 6 2 6 2 6 6 2 6 6 6 2 2 6 2 2 6 8 2 1 1 1 1 2 2 2 6 4 1=306 keypresses in TTML)

Example 2

Sending a Fax to a Fax Machine
SAL
Send: *FX*5551234*The cost of the components is 500.23
(Keys:)
TTML equivalent
Send: ..FX
>to: 5551234
>msg: The cost of the components is 500.23
(Keys:)

Example 3

Request a Stock Quote for Nortel and BCE from the TSE (Toronto Stock Exchange)
SAL
Send: *ST*NTL#BCE*TSE
(Keys: 15)
Receive: Northern Telecom: last trade 128.00
    There is news
    Bell Canada Enterprise: last trade 43.00
TTML Equivalent
Send: ..ST
    >Stock: NTL#BCE
    >Exchange: TSE
(Keys: )
Receive: Northern Telecom: last trade 128.00
    There is news
    Bell Canada Enterprise: last trade 43.00

Example 4

Figure 11:
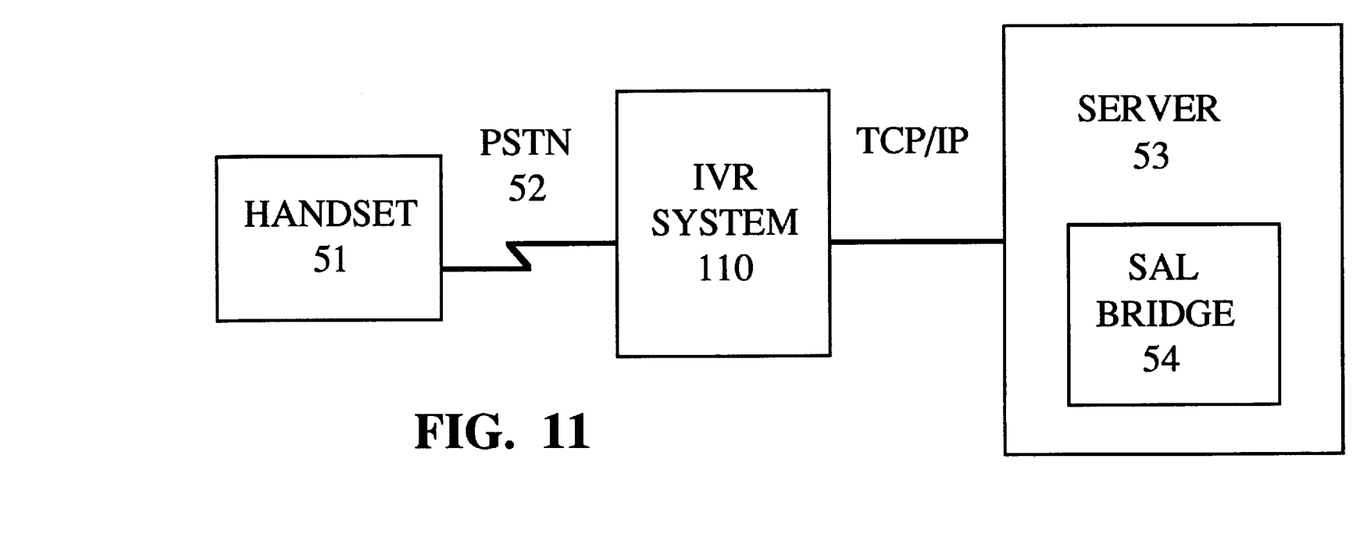
FIG. 11 shows an alternative embodiment, not using SMS.

Request a Stock Quote from the TSE for Nortel including High and Low for the Day
Send: *ST*NTL*TSE*high#low
(Keys: 20)
Receive: Northern Telecom: last trade 128.00
    High: 128.00
    Low: 127.00
TTML equivalent
Send: ..ST
    >Exchange: TSE
    >Stock: NTL
    <.Options
    .>*High
    .>*Low
(Keys: )
Receive: Northern Telecom: last trade 128.00
    High: 128.00
    Low: 127.00
Note: user initiated requests without having to get a template from the server FIG. 11, Alternative Embodiment Using POTS/DTMF FIG. 11 shows an alternative embodiment, not using SMS. A terminal in the form of a handset 51 is connected to an IVR system (interactive voice response system), via the PSTN 52. The IVR can detect DTMF tones sent along the telephone line when keys on the handset are pressed. The IVR can then convert the keystrokes into a service access command which the SAL bridge 54 can recognize. The bridge can be connected to the IVR system by a TCP/IP link, or some other protocol as appropriate. The response to the user, if there is any, can be provided by passing a message from the bridge 54 to the IVR system 110. The IVR system could pass the information in the form automatically generated speech signals to the handset 51. This might be appropriate if the handset has no display. Otherwise, a messaging protocol could be used between the IVR system 110 and the handset 51, and the response displayed on a display on the handset 51.

Other Variations

Although the examples described above use a "*" character as a delimiter, the advantages of the invention would apply even if more than one such character were to be used, or if a different character were to be chosen. Although the examples show the SAL commands being sent using SMS, other message passing systems could be used to reach the server, or they could be sent without encapsulation into messages. DTMF tones are one way, as shown above, another might be ascii character codes, if the remote terminal were capable of sending such codes.

Although the above examples show the service access server as a single entity, the processes running on it could easily be distributed across multiple processors, or distributed across multiple servers, even across multiple servers in different locations. The server could be integrated with other elements of the overall system, e.g. with part of the telephone system or the PSTN, or with service providing elements.

It is not essential that the remote user be connected via a telephone link, or that the remote terminal be a telephone handset. The user could be linked by other types of network, such as the internet. The remote terminal could be a terminal with limited character entry facilities, such as an automated banking terminal, with a display, and either some sort of 12 character keypad, or soft keys next to the screen, as are well known. It is not essential that the remote terminal have a keyboard at all. The characters could be entered using verbal input from the user, and some form of speech recognition, or by a touch sensitive pad, with pattern recognition facilities to recognise handwriting. Many other examples of character input can be conceived, for which the advantages of the invention are applicable.

Although the detection means arranged to detect a service access command sent from the user, has been described in terms of the example of a receiver process running on a server, it could be implemented in other ways, e.g. in hardware, and could be located elsewhere.

The interpreting means arranged to interpret the command to identify the service type has been exemplified as a receiver process on the server, making use of a hash table but it could be implemented in other ways, e.g. in hardware, and could be located elsewhere. It could be located separately from the SAL service processes, and a different syntax could be used for communicating between the interpreting means and the SAL services. If one of the benefits of a limited character syntax lies in ease of use by the user accessing services from a terminal with limited input capabilities, and no syntax translation capabilities, this benefit has been gained as soon as the command is transmitted from the user. Downstream, translation, involving interpretation, to make use of a different syntax, may occur at any point before the information in the command reaches the SAL services, and the services are initiated.

The parameter detection means has been exemplified by the SAL service process running on the server, though it could be implemented in other ways, e.g. in the receiver, or in hardware, and could be located elsewhere.

The service initiating means has been described using the example of the SAL services, though it could be implemented in other ways, e.g. in the receiver, or in hardware, and could be located elsewhere.

Other Fields of Application

Although the invention has been described with reference to a user obtaining information or using information based services, it may prove advantageous in other unrelated fields of application. For example, remote control and/or monitoring of home or industrial appliances, paging of other people, reminder calls back to the user at preset times or dates, and many other applications can be conceived.

Other variations as well as those discussed above will be apparent to persons of average skill in the art, within the scope of the claims, and are not intended to be excluded.

What is claimed is:

1. A method of using a server to provide access to a plurality of unrelated types of services, to a user communicating from a remote terminal to the server, comprising the steps of:

at the server, detecting a service access command sent from the user, the service access command comprising an indication of a service type, the service access command having a syntax which uses only characters selected from alphanumeric characters, and the "#" character, and the "*" character;

interpreting the service access command to identify the service type, to detect if the service access command further comprises one or more parameters relating to the service, and to identify any such parameters; and initiating the provision of a service to the user according to the service type indication detected in the service access command.

2. The method of claim 1 wherein the services comprise communication services for sending information from the user, or obtaining information and sending it to the user.

3. The method of claim 2 further comprising the steps of determining that the service for which access has been requested, is a service type which requires a parameter representing a source or destination for information to be received by the user, or sent by the user respectively;

detecting and extracting the parameter; and providing the requested service using the parameter.

4. The method of claim 1 further comprising the step of deriving in a programmable manner, from the received service type indication, a service start address defining where to find a process for providing the service type indicated.

5. The method of claim 1 wherein the service access command is received via a short message system carried over a signalling channel.

6. The method of claim 1 wherein the syntax of the service access command comprises a single character delimiter preceding the service type indication.

7. The method of claim 1 wherein the syntax of the service access command comprises a single character delimiter preceding any parameters.

8. A method of using a remote terminal to access a range of unrelated types of services made available by a server as set out in claim 1, the method of using the remote terminal comprising the step of:

generating and sending to the server a service access command comprising an indication of a service type, and using a syntax which uses only characters selected from alphanumeric characters, and the "#" character, and the "*" character.

9. A method of using a remote terminal to access a range of unrelated types of services available by communicating with a server, the server being arranged to detect a service access command sent from the user; to interpret the command to identify the service type; to detect if the service access command further comprises one or more parameters relating to the service, and identify any such parameters; and being arranged to initiate the provision of a service to the user according to the service type indication detected in the service access command, the method of using the remote terminal comprising the step of:

generating and sending to the server the service access command, which comprises an indication of a service type, and which, when sent, uses a syntax which uses only characters selected from alphanumeric characters, and the "#" character, and the "*" character.

10. The method of claim 9 further comprising the step of buffering the service access command in the remote terminal before sending to the server.

11. The method of claim 9 wherein the remote terminal comprises a telephone handset.

12. The method of claim 11 wherein the telephone handset communicates over a wireless link.

13. The method of claim 11 wherein the service access command is sent using a short message system carried over a signalling channel.

14. A method of using a server to provide access to a plurality of unrelated types of services, to a user communicating from a remote terminal to the server, comprising the steps of:

at the server, detecting a service access command sent from the user, the service access command comprising an indication of a service type, the service access command having a syntax which uses only characters selected from alphanumeric characters, and the "#" character, and the "*" character, the service access command further comprising one or more parameters relating to the service, and received from the user without sending a prompt to the user;

interpreting the service access command to identify the service type, and to identify the one or more parameters; and initiating the provision of a service to the user according to the service type indication detected in the service access command.

15. A server for providing access to a plurality of unrelated types of services, to a user communicating from a remote terminal to the server, the server comprising:

detection means arranged to detect a service access command sent from the user, the service access command comprising an indication of a service type, the service access command having a syntax which uses only characters selected from alphanumeric characters, and the "#" character, and the "*" character;

interpreting means arranged to interpret the service access command to identify the service type;

parameter detection means arranged to detect if the service access command further comprises one or more parameters relating to the service, and identify any such parameters; and service initiating means, operable according to the service type indication detected in the service access command, to initiate the provision of the service to the user.

16. A system for providing services, comprising the server of claim 15, and other servers for processing different ones of the types of services, the server of claim 15 being arranged to select one of the other servers and request it to provide the service to the user.

17. Software stored on a machine readable medium for carrying out a method of using a server to provide access to a plurality of unrelated types of services, to a user communicating from a remote terminal to the server, comprising the steps of:

at the server, detecting a service access command sent from the user, the service access command comprising an indication of a service type, the service access command having a syntax which uses only characters selected from alphanumeric characters, and the "#" character, and the "*" character;

interpreting the service access command to extract the service type, to detect if the service access command further comprises one or more parameters relating to the service, and extract any such parameters; and initiating the provision of a service to the user according to the service type indication detected in the service access command.

* * * * *